United States Patent
Rohrweck

(10) Patent No.: US 9,824,145 B1
(45) Date of Patent: Nov. 21, 2017

(54) USER EXPERIENCE IN SOCIAL NETWORKS BY WEIGHTING USER INTERACTION PATTERNS

(71) Applicant: Google Inc., Mountain View, CA (US)

(72) Inventor: Florian Rohrweck, Zurich (CH)

(73) Assignee: Google Inc., Mountain View, CA (US)

( * ) Notice: Subject to any disclaimer, the term of this patent is extended or adjusted under 35 U.S.C. 154(b) by 341 days.

(21) Appl. No.: 14/058,183

(22) Filed: Oct. 18, 2013

(51) Int. Cl.
*G06F 17/30* (2006.01)

(52) U.S. Cl.
CPC .... *G06F 17/30861* (2013.01); *G06F 17/3053* (2013.01); *G06F 17/3097* (2013.01); *G06F 17/30864* (2013.01); *G06F 17/30867* (2013.01); *G06F 17/30896* (2013.01)

(58) Field of Classification Search
CPC ........... G06F 17/3053; G06F 17/30867; G06F 17/30864; G06F 17/30896; G06F 17/3097
USPC ........ 707/732–734, 723, 748; 709/204, 206; 705/319, 14.49; 726/28
See application file for complete search history.

(56) References Cited

U.S. PATENT DOCUMENTS

| | | | | |
|---|---|---|---|---|
| 6,889,213 B1 * | 5/2005 | Douvikas | .......... | G06F 17/30067 705/1.1 |
| 8,296,373 B2 * | 10/2012 | Bosworth et al. | ............ | 709/206 |
| 8,307,086 B2 * | 11/2012 | Whitnah et al. | .............. | 709/226 |
| 8,566,956 B2 * | 10/2013 | Slater | .............................. | 726/28 |
| 8,621,645 B1 * | 12/2013 | Spackman | .............. | G06F 21/62 726/26 |
| 8,849,911 B2 * | 9/2014 | Rubinstein | .............. | H04L 51/32 709/200 |
| 8,856,165 B1 * | 10/2014 | Cierniak | ................ | G06Q 10/10 705/28 |
| 9,215,252 B2 * | 12/2015 | Smith | ....................... | H04L 9/00 |
| 2006/0047605 A1 * | 3/2006 | Ahmad | ............... | G06F 21/6245 705/64 |
| 2006/0282426 A1 * | 12/2006 | Spears | ................... | G06Q 50/10 |
| 2007/0226248 A1 * | 9/2007 | Darr | ....................... | G06Q 10/10 |
| 2011/0213785 A1 * | 9/2011 | Kristiansson et al. | ........ | 707/748 |
| 2011/0264519 A1 * | 10/2011 | Chan et al. | ................ | 705/14.49 |
| 2011/0321175 A1 * | 12/2011 | Slater | .............................. | 726/28 |
| 2013/0014279 A1 * | 1/2013 | Leland | ................ | G06F 21/6245 726/28 |
| 2013/0018965 A1 * | 1/2013 | Ramachandran et al. | .... | 709/206 |
| 2013/0073473 A1 * | 3/2013 | Heath | .......................... | 705/319 |
| 2013/0091213 A1 * | 4/2013 | Diab et al. | .................... | 709/204 |
| 2014/0081959 A1 * | 3/2014 | Kass et al. | .................... | 707/723 |
| 2014/0150109 A1 * | 5/2014 | Fire | ..................... | G06F 21/6245 726/26 |

(Continued)

*Primary Examiner* — Frantz Coby
(74) *Attorney, Agent, or Firm* — Lowenstein Sandler LLP

(57) ABSTRACT

A method includes receiving interaction limitations from actions taken by a plurality of reporting users, for an identified user. The interaction limitations received for the identified user are weighted and a user score generated for the identified user based on the weighting of the interaction limitations provided by the reporting users. The user score for the identified user is adjusted over time based on feedback from the plurality of reporting users and based on average scores of other users. A subset of the plurality of reporting users are identified and the subset of users are provided access to interact with the identified user, based on the generated user scores of the identified user and of each of the plurality of reporting users.

20 Claims, 8 Drawing Sheets

(56) References Cited

U.S. PATENT DOCUMENTS

| | | | |
|---|---|---|---|
| 2014/0245457 A1* | 8/2014 | Qi | G06F 21/6245 726/26 |
| 2014/0278610 A1* | 9/2014 | Carnahan et al. | 705/5 |
| 2015/0312263 A1* | 10/2015 | Bhamidipati | G06F 21/6263 726/26 |

* cited by examiner

USER EXPERIENCE IN SOCIAL NETWORKS BY WEIGHTING USER INTERACTION PATTERNS

BACKGROUND

With the growing popularity of social networks, improving user experience is of utmost interest to social networking sites. As more and more users are increasing their presence on the social networking sites, the users are being exposed to unpleasant people and trolls with questionable motives and aggressive behaviors. Such exposure negatively impact the users social interaction experience. Users can control their exposure to such people by adjusting their privacy settings within their social network accounts. However, such adjustments can only be made after an initial contact with the people with questionable behavior or motives. Additionally, these adjustments result in the restriction of the user's freedom for social interactions thereby compromising their social experience. As a result, the users activities on such social communication platforms decline over time.

It is in this context various implementations arise.

SUMMARY

The present disclosure relates to methods, systems and computer programs for improving user interaction experience by evaluating interaction patterns of various users and filtering users and interaction content for a particular user based on the evaluation. The interaction patterns identify interactions of a particular user and interaction limitations of different types provided as feedback by one or more other users, in response to the interactions of the particular user. The evaluation of the interaction patterns determine the relative rank of each of the plurality of users. Interaction limitation configuration set by a particular user is determined and a subset of the plurality of users, whose individual rankings meet the interaction limitation configuration setting of the particular user, are identified. The identified subset of users are provided access to interactions with the particular user and/or may be allowed access to some portions of the privacy information of the particular user. The identified users are selected based on their interaction reputations in a social communication platform (e.g., social network site or a website) and these users may or may not have had prior interaction contact with the particular user.

It should be appreciated that the present disclosure can be implemented in numerous ways, e.g., a process, an apparatus, a system, or a method on a computer readable medium. Several embodiments of the present disclosure are described below.

In some embodiments, a method is disclosed. The method includes the following method operations: receiving interaction limitations from actions taken by a plurality of reporting users, for an identified user; weighting the received interaction limitations received for the identified user; generating a user score for the identified user that is adjusted over time based on feedback from the plurality of reporting users; and providing a subset of the plurality of reporting users with access to interact with the identified user, based on the generated user scores of the identified user and of each of the plurality of reporting users. The subset of the users may also be provided access to at least a portion of privacy information of the identified user.

In some embodiments, the interaction limitations relate to different types of user actions provided by the plurality of reporting users, in response to a user action of the identified user.

In some embodiments, the feedback of interaction limitations for the identified user are collected periodically from the plurality of reporting users and the user score, generated for the identified user, is refined based on the feedback collected from the plurality of reporting users.

In some embodiments, interaction limitations received from the plurality of reporting users are analyzed to determine type of user actions defined therein. A relative weight for each type of action represented within the interaction limitations, is identified based on severity level of each type of the action. The identified user is ranked based on the relative weight.

In some embodiments, the interaction limitations received from each of the plurality of reporting users is evaluated, a relative weight is determined for each of the plurality of reporting users based on the evaluation, and a ranking and the user score of each of the plurality of reporting users is adjusted based on the corresponding relative weight. The ranking and average score of the plurality of reporting users is used in influencing consideration of the interaction limitation from the corresponding reporting users for generating the user score of the identified user.

In some embodiments, the interaction limitations used for generating the user score for the identified user is refined by filtering out the interaction limitations provided by a particular reporting user, when the ranking of the particular reporting user is below a threshold value.

In some embodiments, a user score for each of the plurality of users who are actively providing interaction limitations, is determined. A minimum threshold value, established by the identified user, is determined for the user score. The user score for the identified user is computed as a function of the weighting of the interaction limitations of each of the plurality of reporting users, user score of each of the plurality of reporting users actively providing the interaction limitations for the identified user, number and type of interaction limitations directed toward the identified user, wherein the user scores of the reporting users meets at least the minimum threshold value set by the identified user.

In some embodiments, the computed user score for the identified user is refined over time based on feedback of interaction limitations gathered from the plurality of users over time, wherein the refining of the user score includes adjusting the user score by a pre-defined recovery factor or a pre-defined penalty factor.

In some embodiments, a method is disclosed. The method includes receiving interaction limitation configuration for a user. An interaction profile is generated for the user based on the interaction limitation configuration. A user database is filtered to identify a subset of users that satisfy the interaction profile for the user. The identified subset of users are granted access to interact with the user and to view at least a portion of the privacy information of the user.

In some embodiments, the interaction limitation configuration identifies a distinct interaction limitation threshold, defined by the user, for each type of interaction and privacy information available for the user.

In some embodiments, the interaction limitation configuration identifies a global interaction limitation threshold, defined by the user, for all types of interaction limitations and privacy information available for the user.

In some embodiments, the subset of users are identified within the user database with a user score that meet the interaction limitation threshold defined in the interaction profile for the user.

In some embodiments, the subset of users are identified within the user database with a user score that meet the interaction limitation threshold for particular type of interaction limitation or privacy information defined in the interaction profile for the user.

In some embodiments, a method is disclosed. The method includes the following method operations: receiving interaction limitations by actions taken by a plurality of reporting users, for an identified user, wherein the actions taken define social feedback for an action taken by the identified user, the social feedback defining an opinion concerning the action of the identified user, the opinion being expressable in a plurality of forms, each form is associated with a predefined and quantifiable weighting metric; weighting the received interaction limitations for the identified user; generating a user score for the identified user that adjusts over time based on feedback from the plurality of reporting users; and providing a subset of the plurality of reporting users with access to interact with the identified user, based on the generated user scores of the identified user and of each of the plurality of reporting users.

In some embodiments, each form expressed in the opinion of the received interaction limitations is weighted based on severity level accorded to the opinion.

In some embodiments the severity level of each form expressed in the opinion is defined by the identified user.

In some embodiments, the severity level of each form expressed in the opinion is pre-defined.

These embodiments may provide one or more of the following advantages: users are identified by evaluating their intentions and by determining their reputation and by matching to a minimum interaction standard set by a particular user in order to provide the identified users with access to interact with the particular user. The various embodiments also address the issue that has commonly plagued conventional processes wherein the reporting tools commonly used for reporting malicious users are being abused, by evaluating users interactions and computing the users interaction quality score. The users interaction quality score (or simply 'user score') takes into consideration feedback from other users in response to interaction limitations generated by the respective users in order to ensure that the users are not themselves abusing the various reporting tools used for reporting malicious users. The embodiments are cost-effective as it results in a higher probability of avoiding false-positives while allowing high-quality moderation, ultimately leading to higher user-satisfaction and higher efficiency in the feedback-reporting-and-reviewing procedures. The embodiments also provide greater interaction freedom for the users by allowing the users to define a threshold value of interaction behavior that other users have to meet before being provided with access to interact with the particular users. The users may also provide access to profile related information to the other users.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

DETAILED DESCRIPTION

Figure 1A:
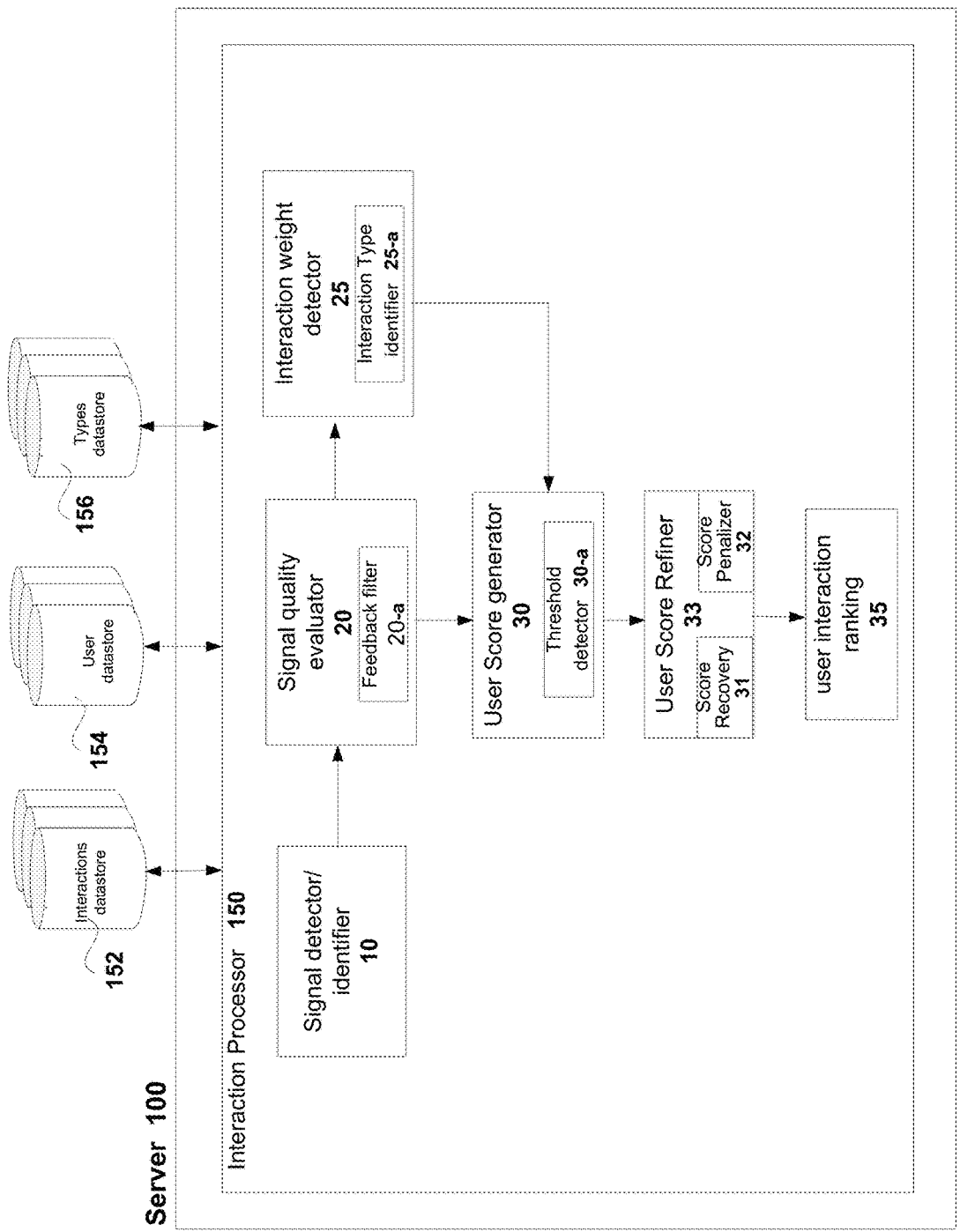
FIG. 1a illustrates an interaction processor used in computing user interaction ranking, in accordance with some implementations of the present disclosure.

The following implementations describe methods, computer programs, and systems for improving user experience in social networks by identifying and evaluating interaction signals generated by a plurality of users to determine online reputation of the users as they relate to an identified user. The interaction signals generated by the plurality of users (for e.g., reporting users), provided in response to a particular user's actions, identify a variety of interaction limitations. For purposes of clarity, the users may be classified into reporting users and posting users. A posting user is one that initiates on online action (for e.g., provides an article, initiates a message, etc.). A reporting user is one that provides comments to the online action provided by the posting user. A user may be classified as either a reporting user or a posting user (or simply a "particular user" or "identified user") based on the type of online interaction provided by the user. As a result, a user may be a reporting user when the user comments on other user's online action and may be a posting user when the user initiates a message or provides an article, etc.

A user's reputation and ranking is based on his/her own online actions/interactions provided as a posting/reporting user, as well as interaction limitations provided by other reporting users, in response to the user's online actions/interactions. The interactions/interaction limitations related to a particular user may be analyzed to determine a type, quality and number of interaction limitations. The various interaction limitations are weighted based on their types and the reporting users are ranked using the weights accorded to each type of interaction limitations and the number of interaction limitations of each type generated by the respective reporting users. The particular user may set a threshold value for different types of interaction limitations. The threshold value is used to select a subset of reporting users whose ranking meet or exceed the threshold value and to filter out the reporting users whose rankings do not meet the threshold value. For example, when a reporting user's ranking falls below the threshold value set by the particular user, the reporting user's interactions are filtered out of consideration and the reporting user is not provided access to interact with the particular user. Additionally, the reporting user whose ranking is below the threshold value may not be provided access to view the privacy information of the particular user. Similarly, when the reporting user's ranking is equal to or exceeds the threshold value, the reporting user is granted access to interact with the particular user and he/she may also be provided access to view all or at least partial aspects of privacy information of the particular user. Such filtering, based on interaction reputation of different users, permits the particular user to have high quality interactions with reputable users while preventing/avoiding exposure to disruptive users (for e.g., users that generate negative noise) that might have a negative impact on the particular user's interaction experience.

The various implementations take into consideration different aspects associated with social interactions in order to allow a particular user to have quality interactions with specific ones of the reporting users, based on their ranking and reputation. In order to determine the ranking and reputation of each of the reporting users, each type of interaction limitation generated by the respective reporting users is evaluated and accorded a weight and a user score is computed for each of the reporting users as a function of the interaction limitations generated by the respective reporting user and the relative weight of each type of interaction limitations. In some implementations, the user score is computed by not only evaluating the interaction limitations of the reporting user but by also evaluating feedback provided by other users in response to the reporting user's interaction limitations. The generated user score is then used to rank the reporting user.

Once the reporting users are ranked based on the quality of interaction limitations, a particular user's interaction limitation configuration is determined and used to identify a subset of reporting users for providing access to interact with the particular user and/or private information sharing. The interaction limitation configuration of the particular user identifies a threshold value set by the particular user for each type of interaction limitation and/or privacy related information (e.g., user profile information) of the particular user. The interaction limitation configuration of the particular user is used to generate the particular user's interaction profile. The ranking of each of the identified subset of reporting users meets or exceeds the threshold value defined in the particular user's interaction profile. The identified subset of reporting users are granted access to at least a partial aspect of the privacy information of the particular user and/or are provided access to engage in interactions with the particular user. The threshold value for filtering out the reporting users may be set as a global value for all types of interaction limitations/privacy related information or the threshold value may be set based on severity level associated with each type of interaction limitations/privacy related information.

The various implementations discussed herein provide ways to determine reputation and ranking of reporting users without the particular user having to encounter a negative experience with other users. The particular user does not have to keep track, generate, maintain or share any list of blocked users to identify malicious or abusive users. Evaluating the reputation and ranking of the reporting users' based on the particular user's interaction profile will ensure that the reliability and quality of interactions is maintained at a standard defined/driven by the particular user. The reputation and ranking of the reporting users relies not only on the amount of interaction signals generated by the reporting users themselves but also relies on the interaction quality of such signals as determined by the feedback received from other users, in response to the generated signals. Consideration of the quality of interactions addresses the issue related to 'crusading users' or 'crusaders'. Crusaders are users that look up content they don't like and flag everything that they consider inappropriate even when the content may not be offensive for most other users and/or does not violate any policy/terms of service (TOS). Various implementations described herein provide an economical way to increase the reliability of the gathered interaction data by ranking the reporting users' interaction quality and using the ranking to filter out unwanted reporting users whose reputations do not meet the required standard set by a particular user.

The computed user score used in ranking the reporting users are refined periodically by collecting and evaluating the ongoing interactions of the reporting users, feedback from other users and the refined score is used to adjust the list of reputable users for having quality interactions with and to efficiently identify abusive/malicious users that abuse the system. The user related information is maintained in a user datastore and used for providing access for interaction and/or for providing access to at least partial aspects of privacy information of different users.

With the above brief description, various implementations will now be described in detail with reference to the drawings. FIG. 1A represents a simplified block diagram of an interaction processor 150 that is configured to execute on a computing device, e.g., a server computing device (or simply a 'server') 100, and used to compute user interaction ranking of a plurality of users who are active in a social communication platform (e.g., social network, any product related platform for reporting bugs and/or requesting user feedback), in some implementations. The server 100 may be hosted by a service provider, e.g., a social communication platform service provider. As illustrated in FIG. 1A, the interaction processor 150 includes a plurality of modules that are configured to evaluate interaction data received from a plurality of users to determine the relative ranking and reputation of the users. Some sample modules within the interaction processor 150 include signal detector/identifier 10, signal quality evaluator 20, interaction weight detector 25, user score generator 30, user score refiner 33, and a user interaction ranking 35. It should be noted that the aforementioned modules are sample modules and should not be considered limiting. One or more modules may be integrated into other modules or additional modules may be provided to determine ranking of the plurality of users.

Figure 2:
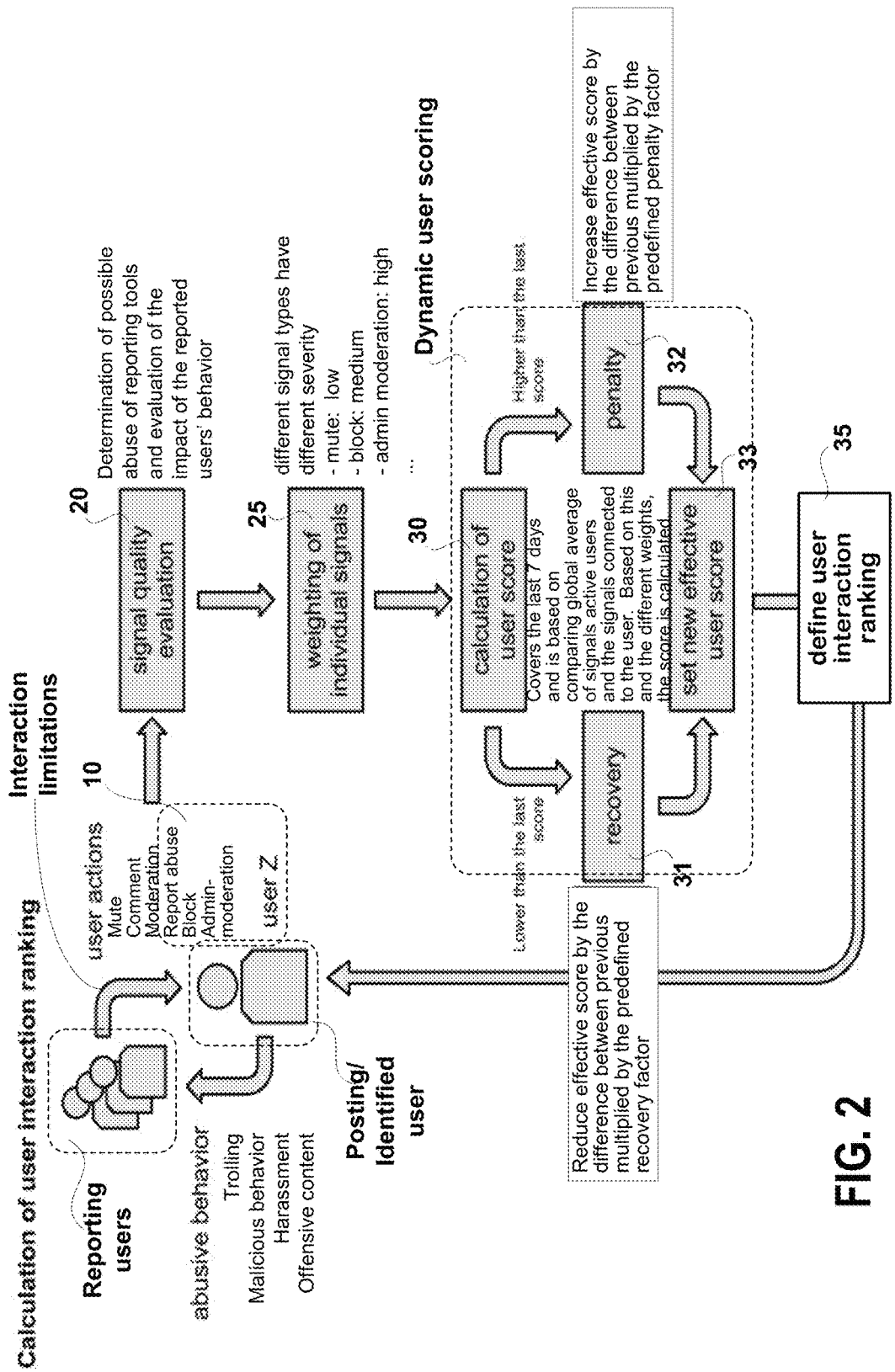
FIG. 2 illustrates an user interaction ranking calculation process flow implemented in accordance with some implementations.

FIG. 2 illustrates a process flow using the various modules of the interaction processor 150 to determine a relative interaction ranking of the plurality of users. Like named modules are referenced using the same reference numeral. Referring simultaneously to FIGS. 1A and 2, the process flow begins with the detection of user interaction signals generated by a plurality of users. The signal detector 10 is configured to detect the user interaction signals and identify interaction limitations, e.g., comments, postings, or actions, generated by a plurality of reporting users, as illustrated in box 10 in FIG. 2, in response to an identified user's interaction. The interaction signal detector 10 identifies different types of interaction limitations provided in the interaction signals. Interaction, as used in this application, is an action or response that is initiated by a user seeking a response from another user. The interaction may also include a response or action provided by a user in response to an action from another user. Interaction limitations, as used in this application, defines a feedback action/response that restricts or provides restriction on a particular user/interaction of the particular user. The action/response of the interaction limitations may be in the form of flags provided by users as feedback to comments, interactions or postings of a particular user. For example, the actions/responses provided in the interaction limitations may include muting/ignoring a comment, blocking a user, deleting a user's comment, providing a comment, reporting a comment/post/message for abusive content, reporting a user as having abusive characteristics, request administrative moderation for a comment posted by a user, etc. The above list of actions/response should not be considered restrictive. Additional or fewer actions/responses may be identified from the signals generated by the plurality of users. The interactions and interaction limitations provided by different users may be maintained in an interaction datastore 152 and retrieved when needed.

The identified interaction limitations are provided as input to a signal quality evaluator (or simply 'evaluator') 20, as illustrated in FIG. 1A. The evaluator 20 is configured to evaluate the quality of signals detected to determine the quality and source of the signals and to determine if a user is abusing the tools and, if so, impact of such behavior. For instance, a crusading user may flag comments/posts/messages they consider inappropriate or don't like, e.g., flagging political views, sexual orientation, religion, etc. To address the abusive behavior of such users, the evaluator 20 analyzes the signal quality to determine if the signals originate from a single or select few users and target certain types of comments/posts/messages, if the signals originate within a certain period of time and target certain users, or if the signals are of particular types and are generated within or at a certain period of time and are being targeted at certain users/interactions, etc. As part of the analysis, the evaluator 20 may further verify abusive nature of behavior of certain users by obtaining user related information from a user datastore 154 and determining if the certain users related to the signals have abuser/malicious user tags associated with them. The user related information obtained from the datastore 154 may provide some type of indication, for e.g., flags/tags, that the users are potentially malicious users or abusers. When the evaluator 20 determines that one or more reporting users are potential abusers of the system, the evaluator 20 may mark, tag or flag such reporting users, if not already marked/flagged, to enable other modules within the interaction processor 150 to easily detect the abusive users. For users that have already been tagged, the evaluator 20 may update the corresponding user related data to confirm such abusive behavior, for e.g., updating number of other users reporting the abusive characters of these reporting users. A feedback filter 20-a within the evaluator may be used to filter out the interaction limitations originating from such reporting users, based on the evaluation.

In some implementations, the evaluator 20 may from time to time collect additional feedback signals directed toward the interaction provided by a particular user, from the plurality of users and evaluate the interaction limitations provided in the feedback in a fashion similar to the evaluation of the interaction limitations described above. Information from the evaluation of the interaction signals received from the plurality of reporting users is provided to the interaction weight detector 25 so that the reporting users ranking may be defined from the initial signals and later refined based on information from the feedback signals.

The interaction weight detector module 25, shown in FIG. 1A, receives the information related to the interaction limitations from the evaluator 20 and employs an interaction type identifier 25-a logic to identify the different types of interaction limitations provided therein. The interaction type identifier 25-a may interact with the types datastore 156 to determine the various types of interactions that are available in the social communication platform within which the interactions and interaction limitations are received and evaluated. The interaction weight detector 25 then accords an appropriate weight factor for each type of interaction limitation based on the severity level of the respective interaction limitation type. For example, in some implementations, a muting limitation may be accorded a lower weight than the blocking limitation (medium weight) and the blocking limitation, in turn, may be accorded a lower weight than the admin moderation limitation (high weight). The admin moderation limitation is generated when an interaction from a user (either reporting or posting user) requires administration intervention. The weighting factor is used for generating a user score of a user.

The user score generator 30 receives the input from the weight detector 25 and further analyzes the interaction limitations to identify additional features or characteristics of interaction limitations as it relates to each user (either reporting user, posting user or moderating user, wherein the moderating user is a user who is designed to moderate the postings/interactions of users in a social network) including, but not limited to, distribution of comment deletions per moderating user, distribution of comment/message flags per reporting user, etc. Each user is associated with a weighting factor based on the analysis. For example, in some implementations, a weighting factor may be established for each reporting user based on the number of flags raised by the reporting user for each type of interaction limitation generated in response to other users interactions. In some other implementations, a weighting factor may be established for a particular user based on the number of flags associated with the particular user. The number of flags associated with the particular user includes number of flags raised by reporting users in the feedback signals as a response to the particular user's interactions as a posting user, as well as, number of flags raised by the particular user in his/her feedback signals as a reporting user in response to other users' interactions. The number of flags may be identified for each type of interaction limitation. Using the particular user's established weighting factor, a user score is computed for the particular user as a function of the established weighting factor of the particular user and the interaction signals connected to the particular user as it compares to the global average of interaction signals generated by active users.

The computed user score is periodically refined based on the evaluation of the ongoing signals generated by the particular user and the feedback signals generated by the other active reporting users. A user score refiner 33 collects the various evaluated signals from the different users as it relates to the particular user. The score refiner 33 then uses the evaluated signals and the computed user score of the particular user to generate a new effective user score for the particular user. The new effective user score is subsequently used to adjust the relative ranking of the particular user. In some implementations, the new effective user score for the particular user is determined by first computing a new user score using the analysis of the feedback signals and the particular user's ranking adjusted. Upon computation, the new user score of the particular user is compared against the previous user score. Based on the comparison, the new user score is adjusted by a predefined adjustment factor. For example, when the new user score is lower than the original or previous user score for the particular user, the user score refiner module 33 computes the new effective user score by reducing the new user score by a factor of the previous user score and a score recovery factor, using a score recovery logic module 31. Similarly when the new user score is higher than the previous user score, the user score refiner module 33 computes the new effective user score by increasing the new user score by a factor of the previous user score and a predefined penalty factor, using a score penalty logic module 32. Thus, according to the above examples, depending on the reporting user's behavior, the reporting user's new effective score=[reporting user's previous user score−(penalty factor*previous user score)] or [reporting user's previous user score+(recovery factor*previous user score)]. In some implementations, the predefined penalty factor and the predefined recovery factor may be same value. In alternate implementations, the predefined penalty factor may be different than the predefined recovery factor. The above example identifies one way of adjusting the user score of the users to reflect the current ranking of the users, in some implementations, and that other implementations may use other ways to adjust the user score of the users. The reporting user is then associated with the new effective user score. The new effective user score is maintained in the user datastore 154 alongside the previous/original user scores for each of the reporting users and retrieved periodically for user score refinement. Thus, based on the interactions of the particular user and other reporting users feedback for the particular user, the reputation of the particular user grows or declines and the score refiner module 33 self-corrects the user scores accordingly. In some implementations, the time period for collecting interaction information of different users to refine user score, is preset. In other implementations, the time period may be preset but may be changed based on the amount of interactions recorded within the social network site. It should be noted that the same logic may be used to compute the user score of any user within the social communication platform—a reporting user providing interaction limitations feedback for other users interactions, a posting user generating interactions, or a moderating user moderating the interactions/feedbacks of the various users.

Once the user scores are generated for the reporting users, the user scores are used to rank of the reporting users so as to control which ones of the reporting users are to be provided access to interact with a particular user, in order to increase the quality of the interactions for the particular user. In some implementations, the reporting users interaction ranking is controlled by a minimum bar or a threshold value set for different interaction patterns. For example, the bar or threshold value may be set to define a minimum ranking score that is required of the reporting users in order to provide the reporting users access to interactions with public posts in a social network or a social communication platform, a minimum ranking score required to interact via instant messaging or video chatting, etc. The bar or threshold value may be set by individual users to control which ones of the other users of the social network/social communication platform can be provided access to interact with the user. The threshold value may be a positive integer between zero and ten, zero and fifty, zero and 100, etc., or may be a value defined by interaction limitation characteristics or may be a percentage value so that users that at least meet the value can be granted access to interactions with the user. For example, a user may set the threshold value to the lowest, zero or 1% approval rate, to allow every one or most of the other users to be provided access to interact with the user.

Or, the user may set the threshold value to users that have not been reported for more than 5000 times. Alternately, the user may set the threshold value to a higher level so as to allow access to interact with the user to only high quality users. High quality users, in some implementations, are defined as users that offer only constructive posts and comments that are considered least offensive or abusive. In some implementations, a user may set a single global threshold value for all interaction types. In other implementations, the user may set a distinct threshold value for each interaction type. By providing granular control for each aspect of the social interactions enables a user to have an expected quality interaction experience.

A threshold detector 30-*a* within the user score generator 30 is used to determine the threshold value set by a particular user for each type of interaction. The user score generator 30 uses the information from the threshold detector 30-*a* to determine the users interaction rank using the generated user score/new effective user score (if available). The user score generator 30 is then used to identify users who can be provided access to interact with the particular user and/or view the privacy related information of the particular user. The ranking information of the users is maintained in the user datastore and used in refining user score and for controlling access to view privacy information of users and for providing access to interact with the users in order to have quality interactions.

Continuing to refer FIG. 1A, the weighting factor information is provided as input to the user interaction ranking 35. The user interaction ranking 35 receives the input from the user score generator 30 and the user score refiner 33, analyzes the information based on the weights accorded to each interaction limitation type to determine the reputation of a user associated with the interaction limitations. For example, the analysis may determine reputation of a reporting user as a malicious user or a reputable user by determining characteristics of the interaction limitations generated by other users as it relates to the interactions feedback of the reporting user. Some example characteristics include the number of times the feedback from the reporting user was muted by other users, the number of times the reporting user's feedback comment was removed by other users, the number of times a post/comment/message of the reporting user was flagged by other users, the number of times the reporting user's profile was reported by other users as well as such reports per user ratio, the number of times the reporting user's comments, posts, messages were deleted or redacted by the social service provider, the number of times the reporting user was blocked by other users, etc. The above list of characteristics for determining a reporting user's reputation should not be considered limiting and fewer or additional characteristics may be included in the evaluation. Each interaction limitation characteristic from the analysis relates to at least one interaction limitation type. Each reporting user is initially ranked based on the interaction limitation characteristics identified from the analysis of the interaction limitations and the corresponding user score provided by the user score generator 30 and the user score refiner 33. The ranking information from the user interaction ranking module 35 is used to set the interaction and privacy information restrictions of respective ones of users. Once the reporting users are ranked, the system uses the ranking to control which ones of the reporting users can be provided access to interact with a user and/or access to view some portion of the user profile of the user.

Figure 1B:
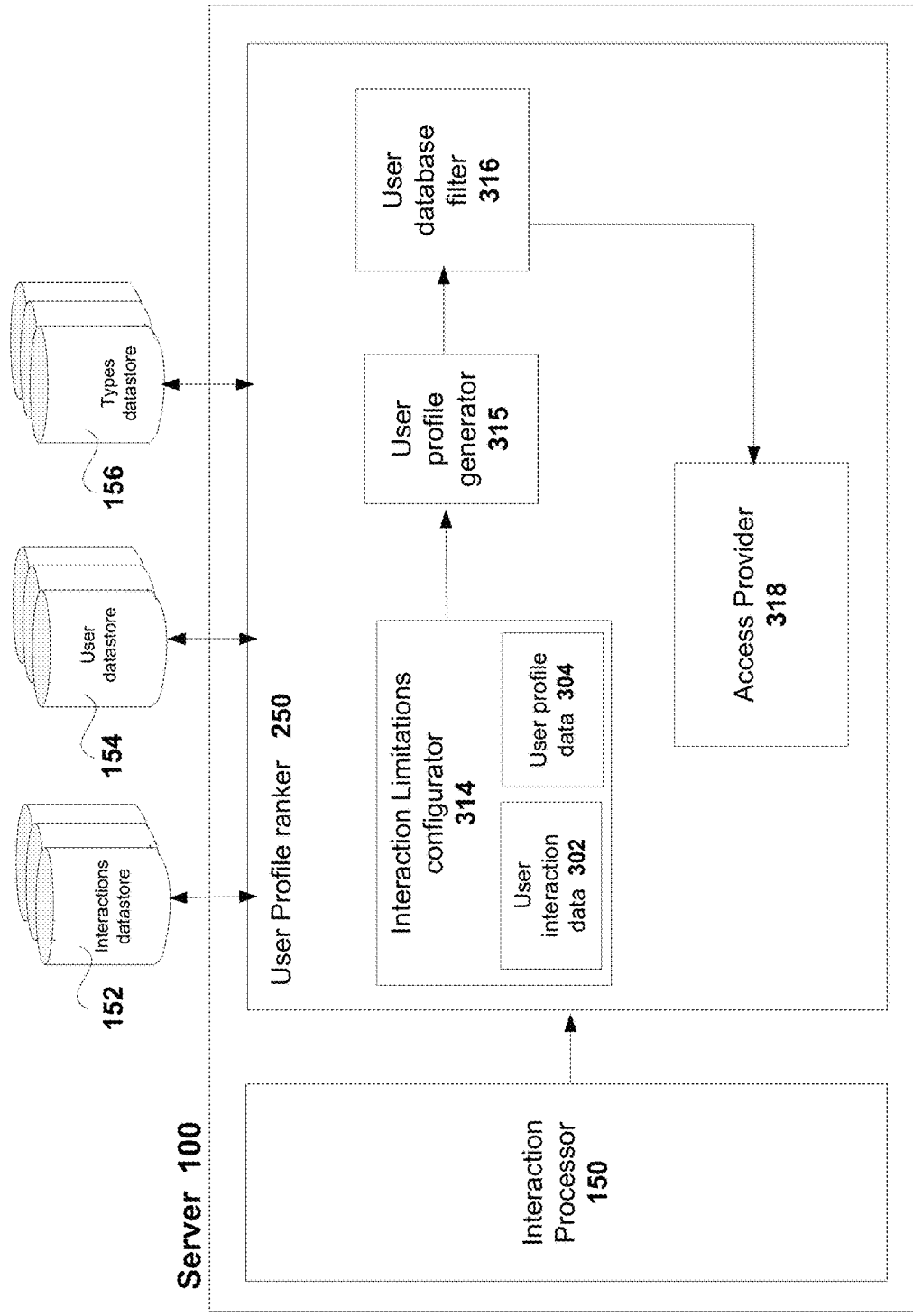
FIG. 1b illustrates an user profile ranker used in providing access to privacy settings and interactions of a user, in accordance with some implementations of the present disclosure.

FIG. 1B illustrates an user profile ranker 250 used to control the user profile ranking of the reporting users to increase the reliability of the generated interaction limitations. In some implementations, the profile ranker 250 interacts with the interaction processor 150 defined in FIG. 1A to obtain the user interaction ranking and to generate interaction profile of a user. The profile ranker 250 includes a plurality of sub-modules used for generating a user's interaction profile and to control the ranking of the users for providing interaction/privacy related information access. In some implementations, the profile ranker 250 includes an interaction limitations configurator 314, a user profile generator 315, a user database filter 316 and an access provider 318. The above list of sub-modules should not be considered restrictive or limiting and additional or fewer sub-modules may be provided within the profile ranker 250 for controlling the ranking of the reporting users.

Figure 3:
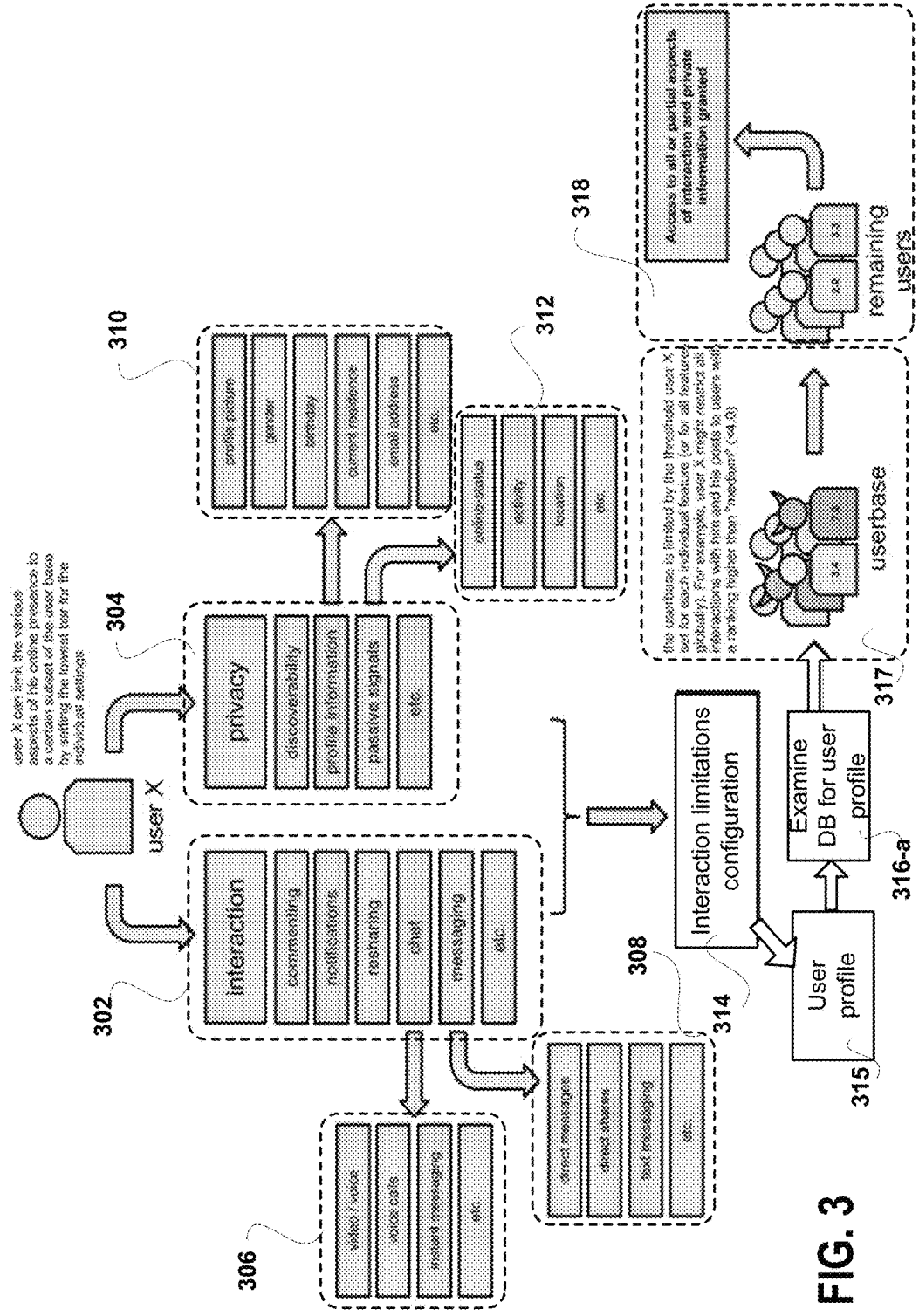
FIG. 3 illustrates an user profile ranking process flow used in providing access to privacy settings and interactions of a user, in accordance with some implementations.

FIG. 3 illustrates a process flow for controlling the user interaction profile based on the user interaction ranking of active users (for e.g., users providing interactions/interaction limitations) using the profile ranker module 250 of FIG. 1B, in accordance with some implementations. The user interaction profile of each user is used for determining which ones of other users can be provided access to interact with a particular user and/or view the particular user's privacy information. Referring simultaneously to FIGS. 1B and 3, the user interaction profile ranking process begins with the identification of threshold values defined by a particular user for different data generated within the social network. The threshold value is set by the particular user to restrict access to personal and profile related data of the particular user to certain individual users of the social network and to enable identification of users who can be provided access to interact with the particular user, so as to maintain integrity and quality of profile data/social interactions. An interaction limitations configurator (or simply 'configurator') 314 analyzes and identifies the different types of data available within the social network. For example, the configurator 314 may analyze and identify the interaction data type 302 and privacy data type 304 as the two main data type classifications within the social network for which a particular user may likely set threshold values for controlling user access. In some implementation, the user may set a distinct threshold value for the interaction data 302 and privacy settings data 304. In other implementations, the user may set a global threshold value for both the interaction data 302 and privacy settings data 304.

To assist in setting the threshold value for the different types of interaction data, the interaction data may be further analyzed by the configurator 314 to identify different types of interactions available within the social network. A user interaction data logic 302, illustrated in FIG. 1B, may be employed to identify a threshold value set by the particular user for each type of interaction identified within the interaction data. Similarly, the configurator 314 may analyze the privacy information data associated with the particular user within the social media site and employ a user profile data logic 304 to identify a threshold value for each type of privacy information data set by the particular user. The user interaction data module 302 and the user profile data module 304 may interact with a user datastore 154 and interaction datastore 152 to obtain, from the types datastore 156, the minimum bar set by the particular user for each type of interaction data and privacy related data defined within the social media site. As and when the particular user sets or changes the threshold value for one or more types of interaction or privacy data, the user interaction data module 302 or the user profile data module 304 detects the changes and updates the respective records within the interactions datastore 152 and the user datastore 154, respectively.

Referring to FIG. 3, in some implementations, the particular user may set separate threshold value for different types of interactions. For example, the user may set distinct threshold value for comments, notifications, re-sharing, chats/instant messages, messages, etc., within the interactions data. Within each type of interactions, additional sub-types of interactions may be identified and distinct threshold values set for each sub-type. For example, as illustrated in box 306, within a chat type of interaction, different sub-types, e.g., video/voice, voice calls, instant messaging, etc., may be identified and distinct threshold values set for each sub-type. Similarly, as illustrated in box 308, the messaging type may include different sub-types, e.g., direct message, direct shares, text message, etc., and the user may set distinct threshold values for each sub-type. Alternately, the user may set the threshold value for a particular type and that threshold value may apply to each sub-type within the particular type or the user may set the threshold value for the interaction as a whole and the set threshold value carries down to each type and sub-types of interactions. The threshold value set by the user may be a numerical value, for e.g., between 1 and 10, between 1 and 100, or may be a percent value, etc.

Similarly, the particular user may identify different types of privacy data fields and set a threshold value for each type of privacy data fields. For example, as illustrated in box 304, the privacy data fields may include such fields as discoverability, profile information, passive signals, etc. Within each privacy data field, additional sub-fields may be identified and threshold value for each sub-field may be distinctly set by the user. For example, as illustrated in box 310, the profile information field within the privacy data may include the following sub-fields—profile picture, gender, birthday, current residence, electronic message address, etc. Some of the privacy data fields and sub-fields may include sensitive and confidential information related to the user and the user may exercise caution by setting very high threshold values for these fields so as to allow only highly reputable or reliable users access to view such information. Similarly, the passive signals field within the privacy information may include sub-fields, e.g., online-status, activity, location, etc., as illustrated in box 312. The user may set a distinct threshold value for each sub-field within each field of privacy data, or as described with reference to the interaction data, the user may set a threshold value for a particular field within the privacy information and that threshold value may apply to all the sub-fields within the field.

Referring simultaneously to FIGS. 1B and 3, once the threshold value of each interaction type and profile related data type defined by a particular user is identified, the interaction limitations configurator 314 gathers the threshold information for all of the interaction and privacy information set by the particular user and generates an interaction limitations configuration for the particular user (represented by box 314 of FIG. 3). The interaction limitations configuration 314 of the particular user describes the minimum bar that other users have to meet, in terms of reputation or ranking, before being granted access to interact with the particular user and/or to view at least a portion of the privacy information of the particular user. The interaction limitations configuration of each user is maintained in the user datastore 154.

Once the interaction limitations configuration 314 is determined, a user interaction profile is generated by the user profile generator 315 for the particular user using the defined interaction limitations configuration. Upon generating the particular user's interaction profile, the user profile and the interaction ranking information maintained in the user datastore 154 is examined (represented by process operation 316-*a* in FIG. 3) using user database filter 316 (represented in FIG. 1B), for all users (represented by 317 in FIG. 3) to find a subset of users from the user datastore 154 whose relative ranking and user score match the threshold value defined in the user profile of the particular user.

The user score and ranking identify which ones of the users in the user base are malicious or abusive users and which ones are reputable users. For example, in some implementations illustrated in box 317 of FIG. 3, users with a lower user score, for e.g., a user score less than 4.0, are indicated to have higher ranking and considered to be reputable and users with higher user score, for e.g., a user score that is greater than 4.0, are indicated to have lower ranking and considered to be malicious, abusive or otherwise less reputable. In alternative implementations, the higher user score (for e.g., greater than 4.0) may be associated with reputable users and the lower user score may be associated with less reputable users. The aforementioned forms of determining the ranking is an example and other forms of determining the ranking of users may be employed.

The information from the user database filter 316 is used by the access provider 318 to select a subset of users from the user database that are provided access to interact with the particular user or to view all or partial aspects of privacy information of the particular user (represented by box 318 of FIG. 3). The interaction ranking characteristics of identified subset of users meet the quality standard established within the interaction limitations configuration of the particular user for interaction access. The particular user may have quality interaction experience with the identified subset of users without fear of negative impact from malicious or abusive users.

The various implementations, thus, provide ways to identify users that meet the standard set by a particular user using the feedback provided by other users. There is no need for the particular user to have to make initial contact or have negative interactions experience. The implementations provide greater granularity by allowing a particular user to define the level or quality of users desired for each type of interaction and for sharing private information, and the interaction processor and the user profile ranker together assist in identifying the subset of the users within a social network site that meet the standard set by the particular user for each type.

Figure 4:
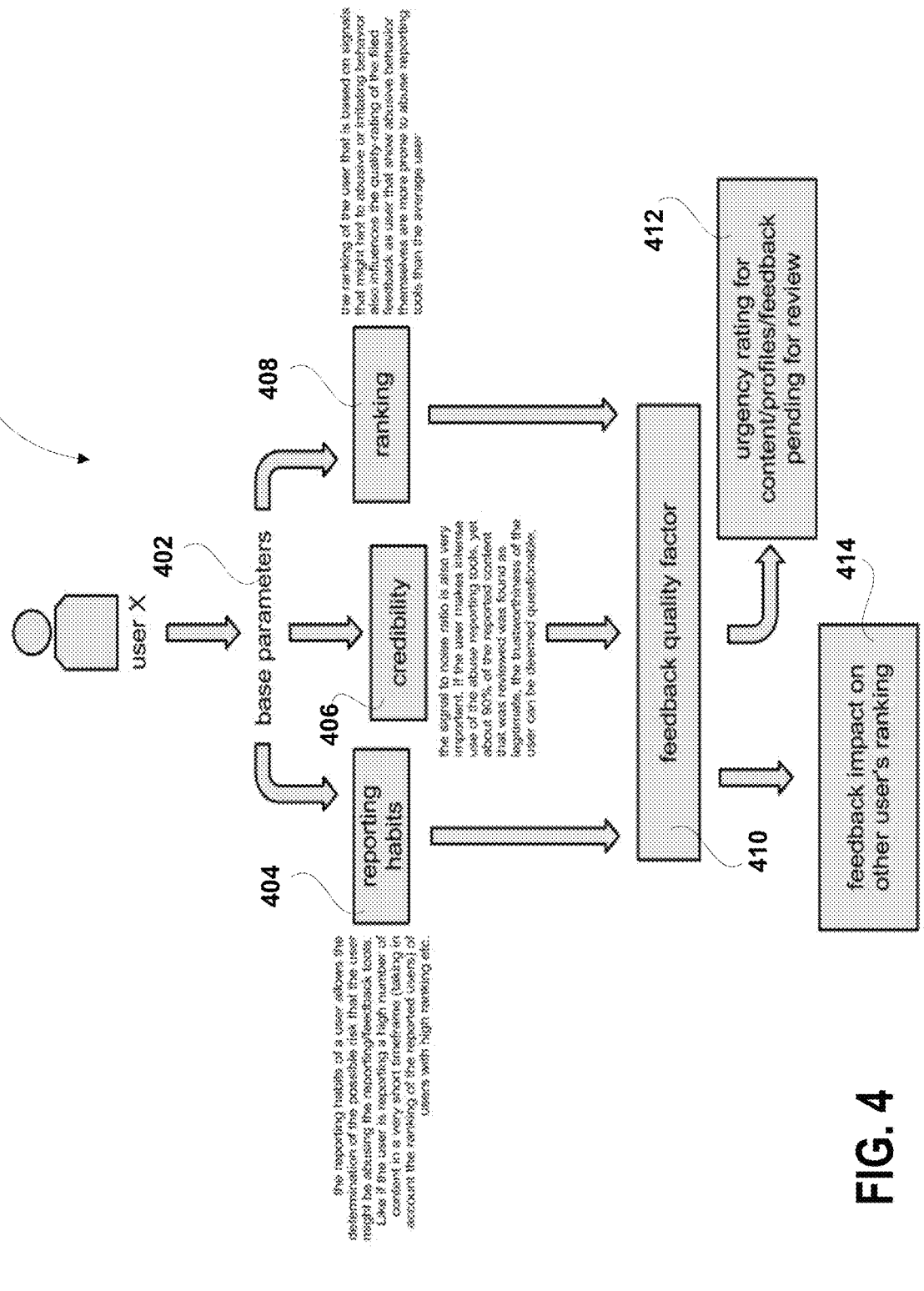
FIG. 4 illustrates an signal quality evaluation process flow, in accordance with some implementations.

FIG. 4 illustrates a process flow for evaluating feedback quality signals generated by the users, in some implementations. The logic for evaluating the signal quality may be provided within the signal quality evaluator 20 of FIG. 1A. A plurality of users generate interactions and interaction limitation signals within a social network. In order to determine the user score and ranking of a reporting user, user X, the signals generated by user X are evaluated to determine the quality and to compute the user score and ranking of user X based on the evaluation. To begin with base parameters 402 accumulated for a particular reporting user, user X, are analyzed by the evaluator 20 of FIG. 1A. The base parameters 402 include reporting habits 404, credibility 406, and an initial ranking 408 of the particular user, user X. The base parameters 402 may be evaluated based on frequency of actions, time period associated with such actions, reporting/activity pattern, etc. For example, the reporting habits 402 of the particular user may indicate that the particular user is reporting on specific ones or lot of users of a social network site, the particular user is reporting on users on a particular day of the week, the particular user is reporting on users within a short period of time, etc. The signal quality evaluator may examine the reporting habits 402 in conjunction with initial ranking of the particular reporting user, user X, and determine if user X is abusing the system.

The evaluator module 20 may also determine the credibility 404 of the particular reporting user, user X, based on the number of negative comments posted or flags raised by user X, in response to comments, postings or interactions of other users that are mostly deemed legitimate or non-offensive. The signal to noise ratio of such comments/flags by user X, in response to postings/interactions of other users, are evaluated to determine the trustworthiness of user X. The signal to noise ratio essentially determines the ratio of number of good reporting versus number of bad reporting in the signals generated by the particular user. For example, if the particular user is always found to criticize or flag comments, postings, interactions of a particular political view or affiliation more than providing encouraging or positive comments, then user X's credibility may be questionable for those interactions. In some implementations, user X's credibility and reputation may be questionable or lower with reference to some types of interactions while user X may be more reputable and credible with reference to other types of interactions. In such cases, the signal to noise ration may be specific to the type of interaction signals generated by user X.

The ranking 408 of the particular user is also examined by the evaluator module to determine the credibility of the signals generated by the particular user. For example, user X's ranking may affect how the signals generated by the particular user are evaluated. For example, the ranking of a user, based on signals that hint at abusive or irritating behavior, influences the quality rating of the generated signals as users that show abusive behavior themselves are more prone to abuse reporting tools than an average user.

The evaluator module uses the base parameters 402 defined by the reporting habits 404, credibility 406 and ranking 408 of the particular reporting user to generate feedback quality factor 410. The feedback quality factor 410 determines the reporting user, user X's reputation, which may, in turn, influence other users reputation and/or ranking brought about by the other users interactions with user X. In some implementations, an abuse report is generated periodically by collecting the base parameters 402 of a plurality of users of the system, and the feedback quality factor 410 and the users reputation dynamically adjusted based on the abuse report. The feedback quality factor 410 and the users reputation determines the urgency rating 412 placed on the content, profiles, and feedback associated with the particular reporting user. For example, when the reporting user has a good reputation, the user's feedback provided in the interaction limitations are of higher value and, hence, have a higher urgency factor associated with it. Urgency factor, in some implementations, may be directly correlated with the quality, with a higher urgency factor being associated with greater quality and lower urgency factor being associated with poor quality. When the reporting user has lower reputation, the reporting user's feedback may be questionable (depending how low the reporting user's reputation is) and their interaction limitations may have to be reviewed or carefully evaluated for abuse of the system. When the reporting user has a lower reputation, their interaction limitations are of lower quality and are, hence, associated with lower urgency factor. The urgency factor associated with the interaction limitations and the reputation of the respective user helps in filtering out the malicious users, abusers, online bullies, etc. The feedback quality factor 410 is used by the user ranking module 35 of FIG. 1A to influence the reporting user's and other users ranking 414. The user ranking of the users drives the quality of users that a particular user is seeking for interactions and for sharing at least some aspects of the privacy related information. It should be noted that a user may be a reporting user when providing feedback to an interaction generated by another user, a moderating user when requested to moderate interactions of other users and/or a posting user when initiating a comment inviting feedbacks. As a result, the user's reputation and ranking encompass all aspects of the interactions within the social network.

Figure 5:
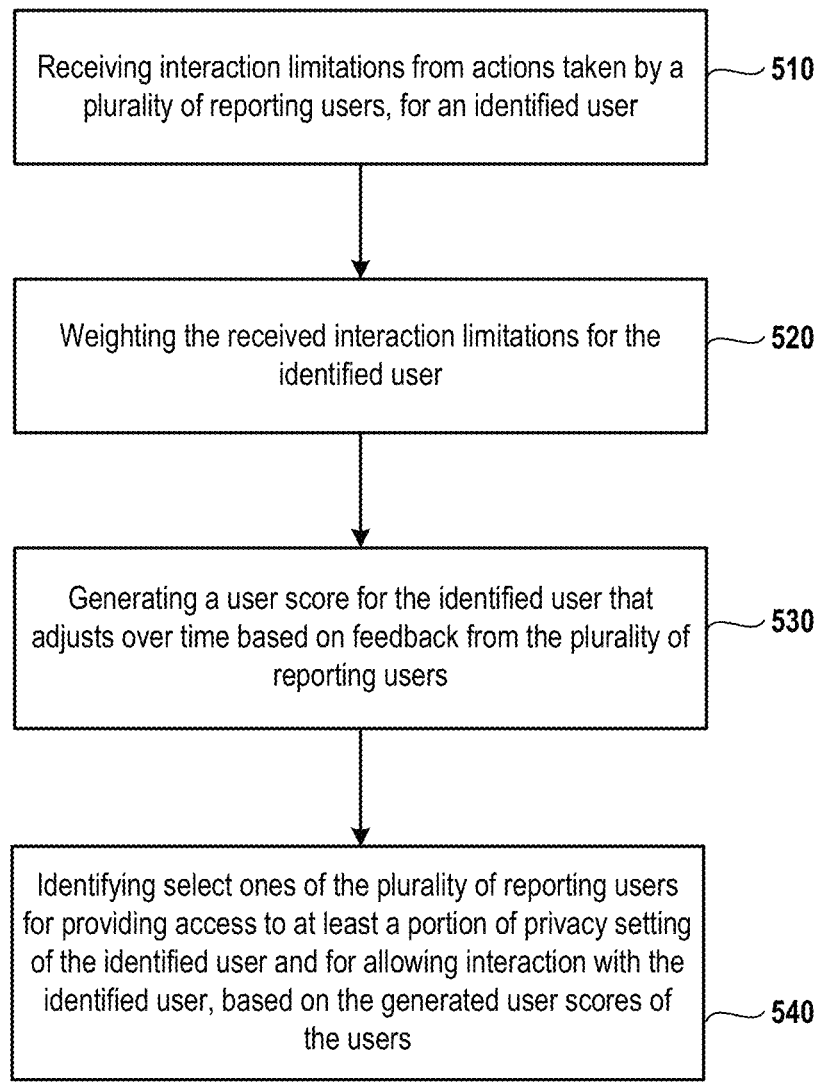
FIG. 5 illustrates method operations used for processing interaction limitations received from a plurality of reporting users of a social network, in accordance with some implementations.

FIG. 5 illustrates method operations for ranking users in a social network, in some implementations. The method begins by receiving interaction limitations from a plurality of reporting users, in response to an identified user's interaction, as illustrated in operation 510. The interaction limitations may be of different types. The interaction limitations of the reporting users are analyzed to determine if one or more reporting users are abusing the system or are malicious users and to filter out the interaction limitations related to the reporting users that are shown to abuse the system or are malicious users.

The interaction limitations received from the plurality of users are weighted for the identified user, as illustrated in operation 520. In some implementations, the weighting of the interaction limitations depend on the type and the severity level of the interaction limitations. In other implementations, in addition to the type and severity level, the ranking of the reporting users are also considered when determining a weighting factor for weighting the interaction limitations for the identified user. For instance, interaction limitations of a reputable reporting user may be weighted more than the interaction limitations of a reporting user with lower reputation.

A user score is generated for the identified user based on the weighting of the interaction limitations, as illustrated in operation 530. The generated user score of the identified user is adjusted over time based on feedback collected from the plurality of reporting users and based on a comparison of feedback signals connected to the user with the average of signals generated by active reporting users globally. The user score is used in ranking the identified user as well as the reporting users.

Select ones of the plurality of reporting users are identified, based on the generated user scores. The identified subset of the reporting users are provided access to interact with the identified user, as illustrated in operation 540. In some implementations, the identified subset of reporting users may also be provided access to view at least portion of the privacy information of the identified user. The subset of the reporting users meet the minimum quality standard set by the identified user for providing access to view some parts of the user profile information and for providing access to interact with the identified user.

Figure 6:
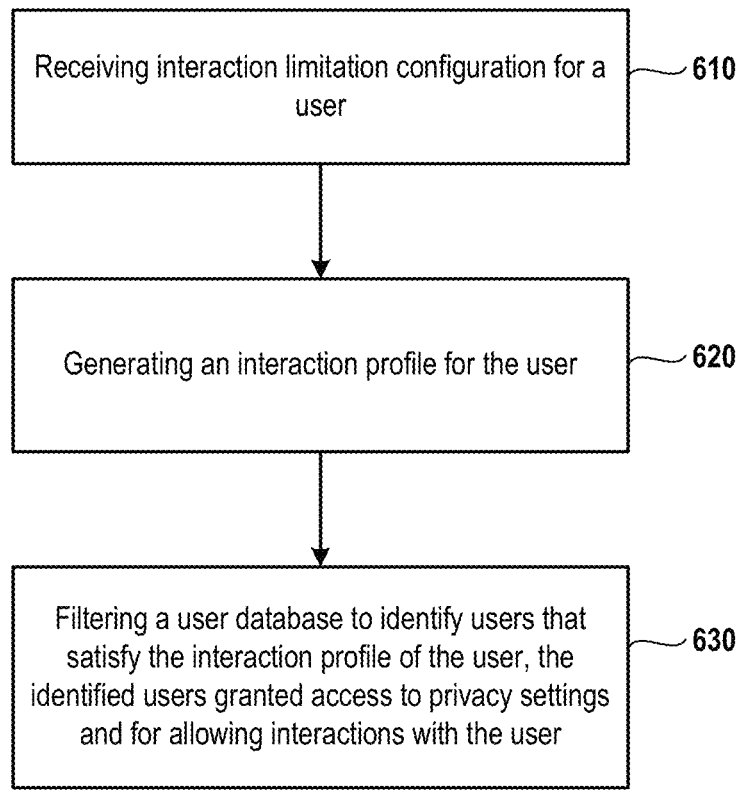
FIG. 6 illustrates method operations used for identifying users that satisfy interaction profile of a user, in accordance with some implementations.

FIG. 6 illustrates a method for controlling ranking of users in order to provide quality interaction within a social network, in alternate implementations. It should be noted that although the various implementations are described with reference to a social network, the implementations can also be extended to any type of online interactions in an online community or website including bug-reporting and feedback. The method begins at operation 610 wherein interaction limitation configuration is received from a user. The interaction limitation configuration includes user defined threshold value for various interaction limitations and profile related data available in the social network. The threshold value may be set by a particular user for different type of interaction limitations so as to identify other users whose ranking and reputation, defined by user score, either meet or exceed the minimum bar set in the threshold value. In some implementations, different types of interaction limitations and profile related data are identified and a distinct threshold value set by the user for each type of interaction limitations and profile related data. In alternate implementations, a global threshold value may be set by the user for the interaction limitations and profile related data. Irrespective of how the threshold value is set, the threshold value defines a minimum bar that the user scores and ranking of other users have to pass in order to be granted access to interact with the user and to view at least some of the profile related data of the user.

The interaction limitation configuration of the user is used to generate an interaction profile for the user, as illustrated in operation 620. The interaction profile of the user determines the quality of reporting users that the user wants to interact with. A user score may be computed for each of the reporting users based on a weighting factor associated with each type of interaction limitations generated by the respective reporting users as well as the weighting of the reporting users themselves based on the type and number of interaction limitation signals raised in their feedback to an interaction. The user score is used to rank the reporting users. The user score is maintained in a user database.

The interaction profile of the user is then used to examine user datastore for reporting users that match the interaction profile of the user and to filter the reporting users within the datastore to identify a subset of reporting users that satisfy the interaction profile of the user, as illustrated in operation 630. The user ranking of the reporting users is used to match to the threshold value set for each type of interaction limitation and the subset of users that match the threshold value are selected and provided access to interact with the user for the specific type of interactions and/or provided access to view at least partial aspects of the profile related information of the user.

The various implementations described above provide an improved way of ranking users and for providing access to interact with a user, and optionally, to control access to view at least partial aspects of the profile related information of the user without the user having to experience negative interactions. Conventional solutions resolved the negative interaction experience by generating and sharing a blocklist. However, the blocklist had to be generated, maintained, constantly verified by users and then shared with/discovered by another user, making conventional solutions cumbersome and prone to errors or stale data. The current implementations allow a user full freedom to interact with select set of users within a social network whose ranking satisfy the user's threshold requirement, thereby providing the user with complete control on who the user interacts with while at the same time avoiding negative experience with malicious or abusive users. Users are ranked based on feedback received from other users of the social network community and the ranking takes into account users, e.g., crusaders, that abuse the system, making this a robust and holistic solution that enriches a user's online interaction experience.

Figure 7:
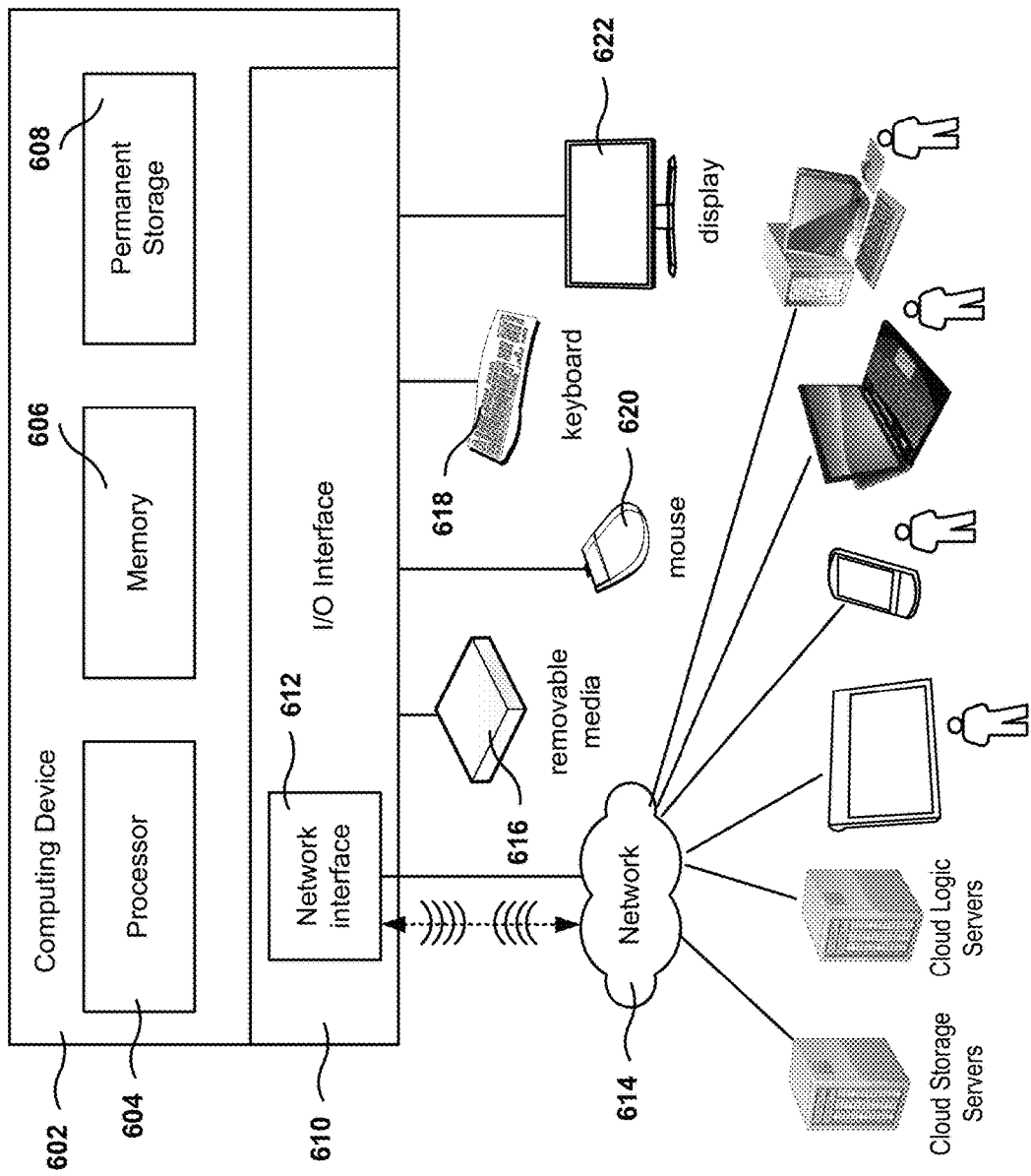
FIG. 7 illustrates a basic infrastructure of a computing device used in processing data obtained from a plurality of users in a social network, in accordance with some implementations.

FIG. 7 is a simplified schematic diagram of a computer system for implementing the present disclosure. It should be appreciated that the methods described herein may be performed with a digital processing system, which in some implementations may be a general-purpose computer system. Special purpose computers, which are designed or programmed to perform only one function, may be used in the alternative. The computing device 602 includes a processor 604, which is coupled through a bus to memory 606, permanent storage 608, and Input/Output (I/O) interface 610.

Permanent storage 608 represents a persistent data storage device, e.g., a hard drive or a USB drive, which may be local or remote. Network interface 612 provides connections via network 614, allowing communications (wired or wireless) with other devices. It should be appreciated that processor 604 may be embodied in a general-purpose processor, a special purpose processor, or a specially programmed logic device. Input/Output (I/O) interface 610 provides communication with different peripherals and is connected with processor 604, memory 606, and permanent storage 608, through the bus. Sample peripherals include display 622, keyboard 618, mouse 620, removable media device 616, etc.

Display 622 is configured to display the user interfaces described herein. Keyboard 618, mouse 620, removable media device 616, and other peripherals are coupled to I/O interface 610 in order to exchange information with processor 604. It should be appreciated that data to and from external devices may be communicated through I/O interface 610. The various implementations can also be practiced in distributed computing environments where tasks are performed by remote processing devices that are linked through a wired or a wireless network.

The various implementations can be fabricated as computer readable code on a non-transitory computer readable storage medium. The non-transitory computer readable storage medium holds data which can be read by a computer system. Examples of the non-transitory computer readable storage medium include permanent storage 608, network attached storage (NAS), read-only memory or random-access memory in memory module 606, Compact Discs (CD), flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Various implementations presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 614. Network 614 can be, for example, the Internet. The Internet is interconnected with a plurality of devices, including cloud storage servers, cloud logic servers, user interface devices, etc. Some devices that can communicate with the Internet access services on various cloud logic servers and cloud storage can include, e.g., tablet computers, smart phones, laptops, desktop computers, television systems, and the like. The devices that can communicate with each other require at least a processor, and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware implementations, and code are configured for enabling the interfacing and interaction with the social network, and the users of the social network, and users on various websites connected to the Internet. The interaction, through social networks will enable electronic messaging regarding current information, shared interests, chat communication, video communication, and general posting, interests, and relationship management. Broadly speaking, a social network is a site that allows at least two people or entities to communicate with one another and share at least one piece of data.

Although the foregoing implementations have been described with a certain level of detail for purposes of clarity, it is noted that certain changes and modifications can be practiced within the scope of the appended claims. Accordingly, the provided implementations are to be considered illustrative and not restrictive, not limited by the details presented herein, and may be modified within the scope and equivalents of the appended claims.

What is claimed is:

1. A computer-implemented method of providing access to interact with an identified user, the method comprising:
   receiving, by a processor, interaction limitations of a first reporting user and feedback of a second reporting user, wherein the interaction limitations of the first reporting user are associated with actions taken by one or more other users, and wherein the feedback of the second reporting user is on the interaction limitations of the first reporting user;
   weighting, by the processor, the received interaction limitations and the feedback;
   generating, by the processor, a user score for the first reporting user in view of the weighted interaction limitations and the weighted feedback, wherein the user score of the first reporting user adjusts over time based on the feedback of the second reporting user; and
   providing, by the processor, the first reporting user with access to interact with the identified user and to view at least a portion of privacy information of the identified user, wherein providing the access is based on the generated user score of the first reporting user exceeding a threshold value for the privacy information set by the identified user.

2. The method of claim 1, wherein at least one of the actions taken by the one or more other users is in response to an action from the identified user, and wherein the interaction limitations comprise at least one of muting, blocking, reporting abuse, commenting, moderating, requiring administrative moderation, deleting, or redacting.

3. The method of claim 1, further comprising:
   collecting feedback periodically from the second reporting user; and refining the user score of the first reporting user based on the feedback collected from the one or more other users.

4. The method of claim 1, wherein the weighting, by the processor, the received interaction limitations further comprises:
    analyzing the received interaction limitations to identify types of actions defined therein;
    determining a relative weight for each type of action represented within the received interaction limitations based on severity level of each type of action; and
    ranking the first reporting user based on the relative weight for each type of action represented within the received interaction limitations.

5. The method of claim 1, wherein the weighting, by the processor, the received interaction limitations further comprises:
    evaluating the received interaction limitations;
    determining a relative weight for the first reporting user based on the evaluation; and
    adjusting a ranking and the user score for the first reporting user based on the relative weight,
    wherein the user score and the ranking are used in influencing consideration of an interaction limitation associated with the one or more users.

6. The method of claim 5, wherein the evaluating the received interaction limitations further identifies at least one of:
    interaction limitations raised for the first reporting user as compared to a global average of interaction limitations raised by active reporting users;
    type of user action defined within each of the interaction limitations; or
    a number of interaction limitations raised for each type of user action defined therein.

7. The method of claim 5, wherein the evaluating the received interaction limitations further comprises:
    refining the interaction limitations by filtering out a subset of the interaction limitations provided by the first reporting user when the user score of the first reporting user is below the threshold value; and
    denying the particular reporting user access to:
        interact with the identified user, and
        view at least the portion of privacy information of the identified user.

8. The method of claim 1, wherein the second reporting user comprises a plurality of second reporting users and wherein the generating further comprises computing the user score as a function of the weighting of the feedback of each of the plurality of second reporting users and computing user scores of each of the plurality of second reporting users.

9. The method of claim 1, wherein adjustment of the user score over time further comprises:
    gathering the feedback, from a plurality of reporting users over time, the feedback for the plurality of reporting users being provided in the form of interaction limitations; and
    evaluating the gathered feedback, the evaluation causing adjustment to the generated user score by a pre-defined recovery factor or a pre-defined penalty factor.

10. A computer-implemented method of providing access to interact with a user, the method comprising:
    receiving, by a processor, an interaction limitation configuration for an identified user;
    generating, by the processor, an interaction profile for the identified user based on the interaction limitation configuration;
    determining, by the processor, a user score of a first user in view of interaction limitations from the first user and feedback from a second user, the interaction limitations from the first user being associated with actions taken by one or more other users and the feedback of the second user being for the interaction limitations from the first user, and wherein the user score of the first user is based on the feedback of the second user;
    filtering, by the processor, a user database to identify one or more users that satisfy the interaction profile for the identified user, the first user being granted access to interact with the identified user and to view at least a portion of privacy information of the identified user, wherein the user database comprises the user score of the first user and the second user, wherein the user score of the first user exceeds a threshold value for the privacy information set by the identified user.

11. The method of claim 10, wherein the interaction limitation configuration identifies a distinct interaction limitation threshold, defined by the identified user, for each type of interaction limitation and the at least the portion of privacy information available for the identified user.

12. The method of claim 10, wherein the interaction limitation configuration identifies a global interaction limitation threshold, defined by the identified user, for all types of interaction limitations and the at least the portion of privacy information available for the identified user.

13. The method of claim 10, wherein the filtering further comprises identifying a subset of users within the user database with user scores that meet an interaction limitation threshold defined in the interaction profile for the identified user.

14. The method of claim 11, wherein the filtering further comprises identifying a subset of users within the user database with user scores that meet the interaction limitation threshold, wherein the interaction limitation threshold is for a particular type of interaction limitation or privacy information defined in the interaction profile for the identified user.

15. A computer-implemented method of providing access to interact with an identified user, the method comprising:
    receiving, by a processor, interaction limitations of a first reporting user and feedback of a second reporting user, wherein the interaction limitations of the first reporting user are associated with actions taken by one or more other users and the feedback of the second reporting user is on with the interaction limitations of the first reporting user;
    weighting, by the processor, the received interaction limitations and the feedback;
    generating, by the processor, a user score for the first reporting user in view of the weighted interaction limitations and the weighted feedback, wherein the user score of the first reporting user adjusts over time based on the feedback of the second reporting user; and
    providing, by the processor, the first reporting user with access to interact with the identified user and to view at least a portion of privacy information of the identified user, wherein providing the access is based on the generated user score of the first reporting user exceeding a threshold value for the privacy information set by the identified user.

16. The method of claim 15, wherein the actions of the one or more users comprise at least one of: initiating a weblog, providing a comment, posting an article, posting a multimedia content, or audio content; and wherein the feedback comprises social feedback of an action taken by the first reporting user, the social feedback defining an opinion concerning the action of the first reporting user, the opinion being expressible in a plurality of forms, each form being associated with a predefined and quantifiable weighting metric, wherein the feedback comprises at least one of muting, blocking, reporting abuse, commenting, moderating, requiring administrative moderation, deleting, or redacting.

17. The method of claim 15, wherein the weighting of the received interaction limitations comprises weighting each of the plurality of forms expressed in the opinion based on a severity level accorded to the opinion.

18. The method of claim 17, wherein the severity level is defined by the reporting user.

19. The method of claim 17, wherein the severity level is pre-defined.

20. A non-transitory computer readable medium comprising programming instructions of providing access to interact with an identified user, the programming instructions, when executed by a processor, cause the processor to:

receive interaction limitations of a first reporting user and feedback of a second reporting user, wherein the interaction limitations of the first reporting users are associated with actions taken by one or more other users, and wherein the feedback of the second reporting user is for the interaction limitations of the first reporting user;

weight the received interaction limitations and the feedback;

generate a user score for the first reporting user in view of the weighted interaction limitations and the weighted feedback, wherein the user score of the first reporting user adjusts over time based on the feedback of the second reporting user; and provide the first reporting user with access to interact with the identified user and to view at least a portion of privacy information of the identified user, wherein providing the access is based on the generated user score of the first reporting user exceeding a threshold value for the privacy information set by the identified user.

\* \* \* \* \*